United States Patent [19]

Beekman et al.

[11] Patent Number: 5,078,892

[45] Date of Patent: Jan. 7, 1992

[54] PHENOL AND SUBSTITUTED PHENOLS AS VISCOSITY MODIFIERS AND STABILIZER SYNERGISTS FOR LIQUID LUBRICATING STABILIZER COMPOSITIONS

[75] Inventors: George F. Beekman, Middletown; Keith A. Mesch, Cincinnati, both of Ohio

[73] Assignee: Morton International, Inc., Chicago, Ill.

[21] Appl. No.: 667,566

[22] Filed: Mar. 11, 1991

[51] Int. Cl.$^5$ .................... C10M 101/02; C07C 51/09
[52] U.S. Cl. ........................... 252/39; 252/399; 252/400.1; 252/404
[58] Field of Search ............ 252/399, 400.1, 39, 252/404

[56] References Cited

U.S. PATENT DOCUMENTS

| | | | |
|---|---|---|---|
| 2,387,571 | 10/1945 | Fikentscher et al. | 260/88 |
| 2,641,596 | 6/1953 | Leistner et al. | 260/98 |
| 2,648,650 | 8/1953 | Weinberg et al. | 260/30.6 |
| 2,711,401 | 6/1955 | Lally | 260/45.75 |
| 2,753,325 | 7/1956 | Banez et al. | 260/82 |
| 3,003,999 | 10/1961 | Kauder et al. | 260/45.75 |
| 3,147,232 | 9/1964 | Norman et al. | 260/23 |
| 3,285,868 | 11/1966 | Hecker et al. | 260/23 |
| 3,298,964 | 1/1967 | Szczepanek et al. | 252/400 |
| 3,453,225 | 7/1969 | Pollock | 260/23 |
| 3,627,716 | 12/1971 | Cohen | 260/23 XA |
| 3,779,962 | 12/1973 | Koenen et al. | 260/23 XA |
| 3,847,853 | 11/1974 | Suzuki et al. | 260/23 XA |
| 4,062,881 | 12/1977 | Kugele | 260/399 |
| 4,178,282 | 12/1979 | Bae | 260/45.75 |
| 4,246,168 | 1/1981 | Sorenson | 260/45.75 |
| 4,544,694 | 10/1985 | Bower | 524/385 |
| 4,701,486 | 10/1987 | Bresser et al. | 524/182 |
| 4,719,022 | 1/1988 | Hyde | 252/35 |
| 4,839,409 | 6/1989 | Conroy | 524/179 |

*Primary Examiner*—Prince Willis, Jr.
*Assistant Examiner*—Maria Nuzzolillo
*Attorney, Agent, or Firm*—Gerald K. White

[57] ABSTRACT

Phenol and alkyl substituted phenols of the formula:

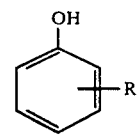

wherein R is hydrogen or alkyl of from 1 to about 20 carbon atoms which significantly reduce the viscosity of and metal salt precipitation from liquid lubricating stabilizer compositions and unexpectedly improve the heat stability of such liquid lubricating and stabilizing compositions.

29 Claims, No Drawings

PHENOL AND SUBSTITUTED PHENOLS AS VISCOSITY MODIFIERS AND STABILIZER SYNERGISTS FOR LIQUID LUBRICATING STABILIZER COMPOSITIONS

FIELD OF THE INVENTION

This invention relates to liquid additives for vinyl halide resins and to resin compositions containing same. More particularly, this invention relates to additives for such resins which additives and additives formulations are and remain liquid at generally normal ambient room temperature for extended periods of time, with improved stabilization performance and without substantial precipitations of metal salt components therefrom. This invention also relates to a method of incorporating such liquid additives and liquid additive formulations into resin compositions and to processing of same.

BACKGROUND OF THE INVENTION

In the processing of vinyl halide resins and more particularly polyvinyl chloride resins (hereafter PVC) to form moldable or extrudable compositions, it is customary to incorporate into the polymeric resin, generally in dry powder form, a variety of additives for special purposes and to achieve the desired properties in the molded or extruded products. Among the additives generally employed are internal and external lubricants, pigments, heat and light stabilizers, fillers, antioxidants and the like. While the stabilizers generally employed are the liquid organotin compounds and while they can be added in liquid form, the other additives are for the most part powders or granules. The normally solid additives can be added individually or as mixtures of such powders or granules and incorporated into the resinous polymeric powder in a mixer, typically a high shear mixer, in which the mechanical working of the material causes a rise in the temperature thereof and the additives become molten at temperatures of 100° C. or higher and dispersed at the elevated temperature. For the most part, the normally liquid stabilizer is added to the polymer first and dispersed throughout the polymer at a relatively low temperature. Thereafter, the solid lubricants and waxes are generally added. Normally the lubricants generally include at least one wax that has a sufficiently low melting point to be melted in the mixer and become distributed on the surface of the polymeric powder. Then other additives may generally be added.

It has been recognized that such methodology is subject to a number of disadvantages and drawbacks. For example, numerous separate, time-consuming and error-prone weighings for each additive is required. Moreover, when masterbatching of additives is attempted, the difference in physical properties of the various additives has led to inhomogeneity of mixtures thereof. Additionally, such mixtures tend to produce non-uniform agglomerations initially, on storage or when introduced into the mixing apparatus with the polymeric powder. Since some additives are used at low levels of about 0.1 part per hundred parts of resin, phr, this becomes a serious problem.

In attempts to avoid such problems it has been suggested to mix the solid paraffinic hydrocarbon wax, employed as the external lubricant, with the other solid additives, heat the mixture to an elevated temperature of 100° C. or higher and thereafter cooling to recover a solid glass-like friable composition to be added to the polymer. However, this process still leads to an undesirable solid which has to be mixed with the polymeric powder along with all the problems that entails. Another less than satisfactory suggestion has been to form an aqueous emulsion of lubricants and stabilizers which is then mixed with solid additive to form a free-flowing additive concentrate powder. However, this process also results in an undesirable solid powder to be added to the polymeric powder. Also attempts to add the additives in a molten state at elevated temperatures has been suggested but this has not really solved any of the problems.

Recently issued U.S. Pat. No. 4,719,022 of Jeffrey R. Hyde, assigned to Morton International, Inc., discloses that it is possible to incorporate all such additives as a liquid formulation which is liquid at normal ambient room temperature or a temperature of 50° C. or less and thereby substantially avoid or eliminate the problems associated with the mixing of solid additives to resin powders. According to said patent these advantages are obtained by employing in sufficient quantity certain oils essentially derived from petroleum and which are liquid at normal ambient room temperature or at a temperature of about 50° C. or less as substantially the only necessary external lubricant for rigid vinyl halide resin compositions. The oils derived essentially from petroleum which are employed according to said patent are aromatic, naphthenic, paraffinic, extracted naphthenic and extracted paraffinic oils which are liquids at ambient room temperature and meet the molecular weight/percent paraffin content criteria described hereinafter. The oils, in addition to being essentially derived from petroleum and being liquids at ambient room temperature, must be within a specified criteria based on the molecular weight and percent paraffin content of the oils. That is, the oils must have a molecular weight and percent paraffin content sufficient to satisfy the following formula:

$$(molecular\ weight) \times (\%\ paraffin\ content) \times 10^{-4} \geq 2.0.$$

The viscosity of such oils which meet the hereinbefore described criteria can range, for example, from about 50 to about 8000 SSU at 100° F. More preferably, the oils are those having a viscosity of from about 100 to about 750 SSU at 100° F., and even more preferably are those oils having a viscosity of at least 300 SSU at 100° F. Most preferably is an oil having a viscosity of about 575 SSU or more at 100° F.

In general, the lower the viscosity and the lower the molecular weight/percent paraffin content criteria value of the oil employed the greater the amount of oil that must be employed in order for the oil to function as substantially the only necessary external lubricant additive in vinyl halide resin compositions. For example, oils having a viscosity of from about 100 to about 300 SSU are employed in an amount of from about 2% to about 3% or more by weight based upon the weight of the resin, with the amount required being generally inversely proportional to the viscosity of the oil. That is, an oil having a viscosity of about 100 SSU is employed in an amount of about 3% or more whereas an oil having a viscosity of about 300 SSU can be employed in an amount down to about 2% or more by weight. Oils having a viscosity of greater than 300 SSU need only be employed in an amount of from about 2% or less, generally down to about 0.5% by weight. That is, an oil having a viscosity of about 575 SSU need only be employed in an amount of about 0.5% to about 2.0% by weight, preferably about 1.4% by weight. Again the amount of oil required is generally inversely proportional to the viscosity of the oil, with the heavier viscosity oils requiring smaller minimum amounts than oils of lesser viscosity.

Such liquid aromatic as well as straight-run and extracted paraffinic and naphthenic oils that may be used according to this invention are generally available commercially. Especially preferred is an extracted paraffinic oil having a viscosity of about 575 SSU at 100° F. and a molecular weight/paraffin content providing a value of about 3.57 according to the aforesaid criteria formula.

Along with said oils the patent discloses that one or more other processing and formulation additives for vinyl halide resins, such as liquid heat stabilizers and metal salt internal lubricants and stabilizers as well as metal release, fusion regulators, melt viscosity control agents and the like can also be employed and that the resulting lubricating and stabilizing compositions resulting are liquids at normal ambient room temperature or at temperature of about 50° C. or less.

The oils of said patent can be combined with liquid vinyl halide heat stabilizers such as liquid organotin or antimony heat stabilizers generally known in the art, especially organotin mercapto carboxylic acid esters and organotin carboxylic acid mercapto alcohol esters such as those disclosed in U.S. Pat. Nos. 2,735,325; 2,641,596; 2,648,650, 4,062,881 and 4,701,486.

Examples of metal salt internal lubricants and stabilizers that may be employed in the liquid lubricating and stabilizing compositions of the invention in U.S. Pat. No. 4,719,022 include calcium, magnesium, zinc, barium and strontium salts of acids selected from tall oil acid, rosin acid, unsaturated fatty acids, saturated neo fatty acids and naphthenic acids. As unsaturated fatty acids salts especially useful in that invention the patent mentions salts of oleic, linoleic, linolenic, erucic, ricinoleic and brassidic acids. Especially preferred are calcium salts, especially calcium tallate, calcium rosinate, calcium oleate, calcium naphthenate and calcium neodecanoate. It is understood that mixtures of one or more salts may also be employed. When added to the liquid lubricating and stabilizing compositions of that patent containing the liquid oil and liquid heat stabilizer the metal salts are generally employed in an amount of from about 0.15 to about 1.0 parts by weight of the resin.

Oxidized polyolefins may be employed in the compositions of the invention of U.S. Pat. No. 4,719,022 as processing additives. As examples of such oxidized polyolefins waxes there can be mentioned, for example, oxidized polyolefins of olefins containing from 2 to 8 carbon atoms and particularly oxidized polyethylenes such as AC-629A, available from Allied Corp. When employed in the liquid lubricating and stabilizing compositions of the invention the oxidized polyolefins are present in an amount of from about 0.0 to about 0.3 parts by weight, most preferably about 0.125 parts by weight.

It has now been discovered that liquid lubricating stabilizer (LLS) compositions of U.S. Pat. No. 4,719,022 comprising the certain oils derived from petroleum and the liquid vinyl halide heat stabilizers, such as the organotin or antimony heat stabilizers, are and remain liquids essentially free of precipitates. However, when the metal salt internal lubricants and stabilizers, such as the calcium salts, are present in the LLS compositions, especially at levels above 0.25 parts by weight, these metal salts cause the LLS to form either a very viscous inhomogeneous mass or gel or solid at temperatures required to produce the compositions or over a period of time such as few weeks or more and the metal salt precipitates out. The presence of oxidized polyolefin wax in the LLS compositions exacerbates these problems.

Although the patentee in U.S. Pat. No. 4,719,022 states that the metal salt can be formed in situ with an excess of free fatty acid to prevent gelation, this produces another problem. The addition of free acid, e.g. oleic acid, to the LLS formulation tends to reduce the external/internal lubricant efficiency, therefore, one must add additional metal salt to keep the necessary external/internal lubricant balance with the result that the LLS formulation solidifies and the metal salt precipitates even more quickly. Moreover, it has been discovered that the free acid, e.g. oleic acid, is also detrimental to organotin mercaptide stabilizers since the free acid reacts with the organotin mercaptide to form organotin carboxylates which are less efficient as heat stabilizers. Thus, with excess free acid present one must increase the amount of tin stabilizer present in the LLS formulation to obtain a given level of stabilization, resulting in increased costs for the lubricant stabilizer composition.

It is therefore an object of this present invention to provide LLS compositions containing metal salt internal lubricants and stabilizers in which the problem of gelation and/or solidification as well as metal salt precipitation is substantially eliminated or greatly inhibited. A further object of the present invention is to provide such improved LLS compositions containing metal salt internal lubricants and stabilizers which remain liquid, precipitation is inhibited and the viscosity of the composition is favorably and significantly reduced without adversely affecting the rheological properties, particularly the external/internal lubricant balance, and stability of the rigid PVC formulations compounded using the LLS compositions. A further object is to improve the stabilizing ability of LLS compositions.

SUMMARY OF THE INVENTION

Phenol and alkyl substituted phenols of the formula:

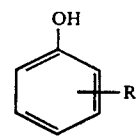

wherein R is hydrogen or alkyl of from 1 to about 20 carbon atoms, preferably from 1 to about 10 carbon atoms and most preferably from 7 to 10 carbon atoms, significantly reduce the viscosity of liquid lubricating stabilizer compositions composed primarily but not exclusively of oils derived essentially from petroleum and which are liquids at ambient temperature and meet a specified molecular weight/percent paraffin content parameter, liquid vinyl halide heat stabilizer and metal salt internal lubricants and stabilizer, especially calcium salts of long chain saturated and unsaturated fatty acids. The phenol compounds also unexpectedly improve the stabilization capability of the LLS compositions and permit the amount of organotin or antimony stabilizer required to produce a given level of stabilization to be reduced. Especially preferred as substituted phenols to be utilized in the invention are nonyl phenol, octyl phenol and isooctyl phenol. Phenol is not suitable for use in resin formulation intended for contact with foods.

The amount of phenol or substituted phenols employed in the LLS compositions of this invention will generally range from about 0.1 to about 20%, preferably about 2 to about 10%, based on the total weight of the LLS composition. The presence of said phenols in the indicated amounts reduce the viscosity of the LLS compositions without adversely affecting the rheological properties of rigid PVC formulations compounded using the LLS compositions. Without the presence of said phenols the LLS compositions of oils derived from petroleum, liquid PVC heat stabilizers and metal salt internal lubricants and stabilizers are or quickly become oily solids at room temperature and often are viscous, inhomogeneous masses at the temperatures required to produce such LLS compositions. The phenols of this invention permit viscosity modification and liquefaction of the LLS compositions and inhibit or substantially prevent precipitation of the metal salt. The shelf stability of the LLS compositions containing metal salts is improved 300 to 400% or more, i.e. a shelf stability of one month or less for LLS compositions containing metal salts but no phenol or substituted phenol component is improved to 3 or 4 months or more when phenol or a substituted phenol is employed in the LLS compositions according to this invention. In addition, the presence of said phenols improves the heat stabilizing capabilities of the LLS compositions. The presence of said phenols produces increased heat stabilization and/or permits a reduction in the amount of primary heat stabilizer component (i.e. organotin antimony compound) required to produce a given level of heat stabilization.

The phenol should be chosen so as not to change the rheology of the polyvinyl chloride compounded with the LLS composition. As examples of phenols that are useful for this purpose according to this invention there may be mentioned the following exemplary compounds: phenol, o-, m-, p-cresol, phlorol, propyl phenol, butyl phenol, p-tert-butyl phenol, p-tert-pentyl phenol, hexyl phenol, heptyl phenol, octyl phenol, nonyl phenol, decyl phenol and the like. Especially preferred are octyl phenol, isooctyl phenol and nonyl phenol.

Moreover, it is surprising that the substituted phenols additionally increase the heat stability of the vinyl halide resin formulations into which they are incorporated since alcohols and diols, which are effective in liquefying LLS compositions containing metal salt lubricants (as disclosed in concurrently filed application Ser. No. 07/667,417; do not provide any such increased heat stability. It is surprising that the alkyl substituted phenols described hereinbefore reduce the viscosity of the LLS composition without changing the rheology of the polyvinyl chloride compounded with the LLS compositions since closely related compounds, such as for example, butylated hydroxy toluene and di-t-butyl hydroquinone do not provide such benefits.

The oil essentially derived from petroleum, the heat stabilizer and metal salts compounds employed in the LLS compositions of this invention are detailed hereinbefore in the Background Of The Invention section of this Application and in the aforementioned U.S. Pat. No. 4,719,022 which is incorporated herein by reference thereto.

The LLS compositions of this invention will generally comprise, on the basis of parts by weight,
0.5-5.0 parts oil
0.1-1.0 part heat stabilizer
0.15-1.0 part metal salt and
0.1 to 20.0% by weight phenol
and preferably comprise:
0.5-5.0 parts oil
0.1-1.0 part stabilizer
0.15-1.0 parts metal salt and
2.0 to 10% by weight phenol.

Generally from about 2 to about 6 parts by weight of the liquid lubricating and stabilizing compositions of this invention, per hundred part by weight of resin, may be added to rigid vinyl halide resins. Even more preferably about 2.0 to about 4.0 parts and most preferably about 3.0 parts by weight of said liquid lubricating and stabilizing compositions are added to vinyl halide resins.

The liquid lubricating and stabilizing composition of this invention are of particular usefulness in the lubrication and stabilization of rigid vinyl halide resins, especially polyvinyl chloride resins, that are formulated to withstand temperatures of at least about 175° C. Such rigid resin compositions may be used to produce pipes, fittings, connections, tubes and the like. The vinyl halide resins that may be included in the lubricated and stabilized resinous compositions of this invention include both vinyl halide homopolymers, such as polyvinyl chloride, polyvinyl bromine, and polyvinylidene chloride, and copolymers formed by the polymerization of a vinyl halide with up to about 30 percent of a comonomer, such as vinyl acetate, vinyl propionate, vinyl butyrate, vinylidene chloride, styrene, ethylene, propylene, ethyl acrylate, methyl methacrylate, acrylic acid, and the like. This invention is also applicable to mixtures containing a major proportion of a vinyl halide resin and a minor proportion of another synthetic resin, such as chlorinated polyethylene, polyacrylate resins, polymethacrylate esters, polyacrylonitrile, and terpolymers of acrylonitrile, butadiene, and styrene.

In addition to the aforementioned ingredients, the lubricated and stabilized resin compositions may have added thereto other customary vinyl halide resin additives, if desired, such as pigments, dyes, other processing aids, fillers, impact modifiers, extenders and the like in amounts normally employed for the purposes indicated.

The liquid lubricating and stabilizing compositions of this invention can be prepared by mixing the appropriate amount of liquid oil, the metal salt, phenol, and oxidized polyolefin components, and the mixture heated by any suitable means to a temperature sufficient to melt the additives, generally about 65.C, and mixed to provide a homogeneous liquid mixture. After the homogeneous liquid mixture is cooled, the liquid heat stabilizer may be added to the composition with suitable mixing to provide a homogenous liquid lubricating and stabilizing composition which is and remains a liquid at normal ambient room temperature or at a temperature of about 50° C. or less.

The metal salt component of the liquid lubricating and stabilizing compositions of this invention may be added to the liquid oils as such or may be formed in situ by adding the appropriate amount of acid and metal oxide or metal hydroxide, such as zinc oxide or hydrated lime. When the metal salt is formed in situ it is preferred that a slight stoichiometric excess of acid be added so that the resulting composition contains some free acid, such as for example, up to about 0.1 part by weight free acid. The free acid appears to be required in certain cases in which the metal salt is formed in situ to prevent gelation of the resulting normally liquid lubricating and stabilizing composition. If desired, up to about 0.1 part by weight of free acid could also be added to the stabilizing compositions when the preformed metal salt is added rather than being formed in situ.

For the purpose of illustrating this invention the following examples are set forth as exemplary of the use of phenols of this invention to modify the viscosity of and/or liquefy LLS compositions containing metal salt internal lubricants and the use of such modified LLS compositions in vinyl halide resin formulations. In the examples the oil employed is an extracted paraffinic oil having a viscosity of about 575 SSU at 100° F. and a molecular weight/paraffin content providing a value of about 3.57 according to the aforementioned criteria formula. The heat stabilizer employed is a liquid organotin carboxylic acid mercapto alcohol ester stabilizer of the aforementioned U.S. Pat. No. 4,062,881 and U.S. Pat. No. 4,701,486 (designated as Stabilizer A) or said stabilizer along with 50% weight 2-mercaptoethyl oleate (MEO)—designated as Stabilizer B or said stabilizer along with 10% weight MEO—designated as Stabilizer C. When an oxidized polyolefin is employed an oxidized low molecular weight ethylene homopolymer (such as AC-629A available from Allied Corporation) is employed.

In the examples all parts and percentages are parts and percent by weight unless specified otherwise.

EXAMPLE 1

A LLS composition was prepared comprising 36% calcium oleate, 55% oil and 9% Stabilizer A. The composition is solid at room temperature and very viscous at 120.C. Addition of 10% nonyl phenol thereto causes the LLS composition to become a liquid with a viscosity of about 1000 cp at ambient room temperature.

EXAMPLE 2

A LLS composition was formed of 12.0 parts oil and 8.0 parts calcium oleate and 4.0 parts Stabilizer B. Nonyl phenol was added to the composition in an amount of 5.0 parts. The viscosity of the composition was modified by the nonyl phenol so that the composition remained a gold-brown liquid with no residue.

For comparison purposes a LLS composition was formed of 12.0 parts oil 8.0 parts calcium oleate, 3.0 parts Stabilizer B and 2.0 parts calcium nonylphenate. The oil/calcium oleate and calcium nonylphenate was heated together in a vessel on a hot plate until liquified. Upon removal from the hot plate, Stabilizer B was added and the composition solidified, demonstrating that the viscosity modification is not due to formation of calcium nonylphenate.

EXAMPLE 3

A 60:40 mixture of oil/calcium oleate was prepared in situ in the following manner. To a reaction vessel 60 parts oil, 75 parts oleic acid and 5 parts nonyl phenol were added and heated to 110° C. and then 10 parts calcium hydroxide was added and the reaction heated to 120° C. for two hours. The temperature was reduced to 110° C. and a further 60 parts oil and 5 parts nonyl phenol added. After the reaction was stopped, 22 parts Stabilizer C were added. The composition is a light caramel colored liquid at room temperature. Essentially no precipitation of calcium salt occurs after 3 months.

EXAMPLE 4

Three PVC resin formulations (D, E and F), each comprising 100 parts PVC resin (Shintech SE-950), 5.0 parts calcium carbonate filler (Omyacarb FT), 1.0 part $TiO_2$, 0.15 part oxidized polyethylene (AC-629A), were prepared. A LLS composition was added to each resin formulation. To Formulation D was added 2 phr LLS composition comprising 36% calcium oleate, 55% oil and 9% Stabilizer A. To Formulation E was added 2.20 parts LLS composition as in formulation D but also containing 10% hexylene glycol. To Formulation F was added 2.20 parts LLS composition as in Formulation D but also containing 10% nonyl phenol. The formulations were each then tested for heat stability on a dynamic mill at 390° F. with the front and rear roll speeds at 30 and 40 rpm, respectively. Chip samples were taken every minute for eight minutes. Observation of color change (delta E) and yellowness index of the chip samples was made using a Hunter colorimeter. The results are shown below and indicate that the PVC formulation containing a LLS composition including nonyl phenol has unexpected, superior heat stability. A difference of about 1.5 units delta E and about 1 unit of yellowness index is considered to be significant.

| Formulation | 1 min. | 2 min. | 4 min. | 6 min. | 8 min. |
| --- | --- | --- | --- | --- | --- |
| | | delta E | | | |
| D | 10.3 | 13.4 | 21.2 | 31.6 | 34.6 |
| E | 9.9 | 13.9 | 21.6 | 30.9 | 33.9 |
| F | 8.0 | 11.2 | 17.3 | 27.0 | 31.49 |
| | | Yellowness Index | | | |
| D | 18.4 | 24.1 | 40.7 | 63.9 | 50.3 |
| E | 17.7 | 25.0 | 41.6 | 63.3 | 55.1 |
| F | 13.9 | 19.5 | 31.8 | 55.0 | 50.2 |

Similar results are obtained when 10% octyl phenol or N-decyl phenol is added to the LLS composition in Formulation F in place of nonyl phenol.

When a PVC formulation similar to Formulation F is prepared except that the calcium salt is not included in the LLS formulation (i.e. the LLS comprises only oil and Stabilizer A) the presence of nonyl phenol did not increase the heat stability of the PVC resin formulation. Similarly, it has been observed that nonyl phenol does not increase the heat stability of PVC resin formulations containing wax and calcium stearate instead of a LLS composition.

As illustrated by Formulation E, hexylene glycol does not improve the heat stability of vinyl halide resins formulations containing a LLS composition having present hexylene glycol to liquefy or reduce the viscosity of the LLS compositions. However, it is often desirable to include hexylene glycol or one of the other alcohols or diols of the following formula along with a substituted phenol in LLS compositions containing a metal salt lubricant for the beneficial and synergistic viscosity lowering and liquefaction properties of the alcohols or diols. Suitable alcohols or diols are those disclosed in concurrently filed Application Ser. No. 07/667,417 and having the formula:

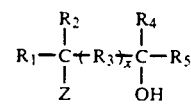

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydroge and Z is hydroxyl.

Especially preferred as alcohols or diols to be included in the LLS compositions along with a substituted phenol of this invention are: isooctyl alcohol, 2-ethylhexanol, cyclohexanol, 2,2,4-trimethyl pentanol, neopentyl alcohol, hexyl alcohol, benzyl alcohol, 2-methyl-2-butanol, 4-methyl-2-pentanol, decyl alcohol, dodecyl alcohol, hexylene glycol, 1,2-propane diol, 1,3-propane diol, 2,2,4-trimethyl pentanediol, 1,3-butane diol, 2,3-butane diol, 1,4-butane diol, 1,6-hexane diol, and

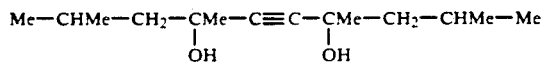

wherein Me is a methyl group. Especially preferred is 2-ethylhexanol and hexylene glycol. When employed in the LLS compositions along with a substituted phenol the alcohols and diols are generally present in an amount of from about 0.1 to about 10% by weight, preferably about 2.0 to about 10% and most preferably about 5.0% by weight based upon the total weight of the LLS compositions.

The viscosity modifying properties of the phenols and the synergistic viscosity modifying properties of a combination of phenols along with an alcohol or diol is illustration by the following example.

EXAMPLE 5

A LLS composition was prepared comprising 36% calcium oleate, 55% oil and 9% Stabilizer A. At 20° C. said composition was an oily solid. The effect of differing viscosity modification agents is shown by adding various viscosity modification agents to portions of the above-described oily solid LLS composition and measuring the viscosity of the modified composition using a Brookfield model HAT viscometer with the sample at 20° C.

| Viscosity Modification Agent | % by weight based on total LLS Composition | Viscosity, cps |
|---|---|---|
| Nonyl phenol | 5.0 | 875 |
|  | 10.0 | 475 |
| Octyl phenol | 5.0 | 1050 |
|  | 10.0 | 550 |
| N-Decyl phenol | 6.0 | 900 |
|  | 10.0 | 500 |
| Hexylene glycol | 5.0 | 500 |
|  | 10.0 | 200 |
| Nonyl phenol and Hexylene glycol | 5.0 5.0 | 150 |

Once produced, the LLS compositions of this invention remain liquid at normal ambient room temperature or a temperature of about 50° C. or less even on storage over extended periods of time. As such, it might be possible that they can be added to rigid polyvinyl halide resins at much lower processing and mixing temperatures than heretofore possible. These lower mixing temperatures greatly improve the internal flow characteristics of the resulting resin compositions, and reduce the tendency of the compositions to stick to processing equipment. Additionally, one is able to obtain finished molded or extruded products having improved surface smoothness. In addition, the substituted phenols unexpectedly improve the heat stability of vinyl halide resin formulation containing same thereby enabling use of a lower level of primary liquid heat stabilizer to obtain a given level of stabilization. Moreover, the fact that substantially all the additives normally required to obtain suitable processing properties for rigid vinyl halide resins are now present in a single liquid lubricating and stabilizing composition eliminates the numerous problems and disadvantages mentioned hereinbefore with respect to the addition of normally solid additives to such rigid vinyl halide resin formulations.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A liquid lubricating and stabilizing composition for addition to a rigid vinyl halide resin, which composition is a liquid at a temperature of 50° C. or less, said composition comprising:
   (a) from about 0.5 to about 5.0 parts by weight of an oil derived essentially from petroleum, which oil is liquid at ambient room temperature and meets the criteria:

$$(molecular\ weight) \times (\%\ paraffin\ content) \times (10^{-4}) \geq 2.0;$$

(b) from about 0.1 to about 1.0 parts by weight of a liquid vinyl halide heat stabilizer:
   (c) from about 0.15 to about 1.0 parts by weight of a metal salt of acids selected from the group consisting of tall oil acid, rosin acid, unsaturated fatty acids, saturated neo fatty acids and naphthenic acids, and wherein the metal is selected from the group consisting of calcium, magnesium, zinc, barium and strontium; and
   (d) from about 0.1 to about 20.0% by weight based on the total weight of the composition of a phenol of the formula:

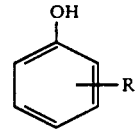

wherein R is hydrogen or alkyl of from 1 to about 20 carbon atoms.

2. A liquid lubricating and stabilizing composition of claim 1 wherein the metal salt is a calcium salt.

3. A liquid lubricating and stabilizing composition of claim 2 wherein the calcium salt is calcium oleate.

4. A liquid lubricating and stabilizing composition of claim 1 wherein the phenol is selected from the group consisting of phenol, o-, m-, p-cresol, phlorol, propyl phenol, butyl phenol, p-tert-butyl phenol, p-tert-pentyl phenol, hexyl phenol, heptyl phenol, octyl phenol, nonyl phenol and decyl phenol.

5. A liquid lubricating and stabilizing composition of claim 2 wherein the phenol is selected from the group consisting of phenol, o-, m-, p-cresol, phlorol, propyl phenol, butyl phenol, p-tert-butyl phenol, p-tert-pentyl phenol, hexyl phenol, heptyl phenol, octyl phenol, nonyl phenol and decyl phenol.

6. A liquid lubricating and stabilizing composition of claim 3 wherein the phenol is selected from the group consisting of phenol, o-, m-, p-cresol, phlorol, propyl phenol, butyl phenol, p-tert-butyl phenol, p-tert-pentyl phenol, hexyl phenol, heptyl phenol, octyl phenol, nonyl phenol and decyl phenol.

7. A liquid lubricating and stabilizing composition of claim 6 wherein the phenol is nonyl phenol.

8. A liquid lubricating and stabilizing composition of claim 1 wherein the phenol is present in an amount of from about 2.0% to about 10% by weight.

9. A liquid lubricating and stabilizing composition of claim 7 wherein the phenol is present in an amount of from about 2.0% to about 10% by weight.

10. A liquid lubricating and stabilizing composition of claim 1 wherein the oil is an oil having a viscosity of at least about 575 SSU at 100° F. and is present in an amount of from about 0.5 to about 2.0 parts by weight.

11. A liquid lubricating and stabilizing composition of claim 7 wherein the oil is an oil having a viscosity of at least about 575 SSU at 100° F. and is present in a amount of from about 0.5 to about 2.0 parts by weight.

12. A liquid lubricating and stabilizing composition of claim 1 wherein the composition also comprises: (e) from about 0.1 to about 10.0% by weight of an alcohol or diol of the formula:

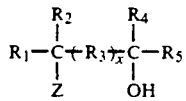

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydrogen and Z is hydroxyl.

13. A liquid lubricating and stabilizing composition of claim 3 wherein the composition also comprises: (e) from about 0.1 to about 10.0% by weight of an alcohol or diol of the formula:

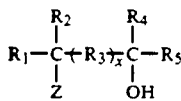

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydrogen and Z is hydroxyl.

14. A liquid lubricating and stabilizing composition of claim 7 wherein the composition also comprises: (e) from about 0.1 to about 10.0% by weight of an alcohol or diol of the formula:

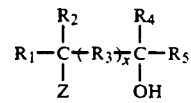

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydrogen and Z is hydroxyl.

15. A rigid vinyl halide resin composition comprising polyvinyl halide resin and from about 2 to about 6 parts by weight per hundred parts by weight resin of a liquid lubricating and stabilizing composition which is a liquid at a temperature of 50° C. or less, said liquid lubricating and stabilizing composition comprising:

(a) from about 0.5 to about 5.0 parts by weight of an oil derived essentially from petroleum, which oil is liquid at ambient room temperature and meets the criteria:

$$(molecular\ weight) \times (\%\ paraffin\ content) \times (10^{-4}) \geq 2.0;$$

(b) from about 0.1 to about 1.0 parts by weight of a liquid vinyl halide heat stabilizer;

(c) from about 0.15 to about 1.0 parts by weight of a metal salt of acids selected from the group consisting of tall oil acid, rosin acid, unsaturated fatty acids, saturated neo fatty acids and naphthenic acids, and wherein the metal is selected from the group consisting of calcium, magnesium, zinc, barium and strontium; and (d) from about 0.1 to about 20.0% by weight based on the total weight of the liquid lubricating and stabilizing composition of a phenol of the formula:

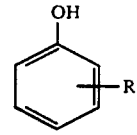

wherein R is hydrogen or alkyl of from 1 to about 20 carbon atoms.

16. A rigid vinyl halide resin composition of claim 15 wherein the metal salt is a calcium salt.

17. A rigid vinyl halide resin composition of claim 16 wherein the calcium salt is calcium oleate.

18. A rigid vinyl halide resin composition of claim 16 wherein the phenol is selected from the group consisting of phenol, o-, m-, p-cresol, phlorol, propyl phenol, butyl phenol, p-tert-butyl phenol, p-tert-pentyl phenol, hexyl phenol, heptyl phenol, octyl phenol, nonyl phenol and decyl phenol.

19. A rigid vinyl halide resin composition of claim 18 wherein the phenol is nonyl phenol.

20. A rigid vinyl halide resin composition of claim 15 wherein the phenol is present in an amount of from about 2.0% to about 10% by weight.

21. A rigid vinyl halide resin composition of claim 19 wherein the phenol is present in an amount of from about 2.0% to about 10% by weight.

22. A rigid vinyl halide resin composition of claim 15 wherein the oil is an oil having a viscosity of at least about 575 SSU at 100° F. and is present in an amount of from about 0.5 to about 2.0 parts by weight.

23. A rigid vinyl halide resin composition of claim 19 wherein the oil is an oil having a viscosity of at least about 575 SSU at 100° F. and is present in an amount of from about 0.5 to about 2. parts by weight.

24. A rigid vinyl halide resin composition of claim 15 wherein the liquid lubricating and stabilizing composition also comprises: (e) from about 0.1 to about 10.0% by weight of an alcohol or diol of the formula:

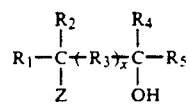

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydrogen and Z is hydroxyl.

25. A rigid vinyl halide resin composition of claim 17 wherein the liquid lubricating and stabilizing composition also comprises: (e) from about 0.1 to about 10.0% by weight of an alcohol or diol of the formula:

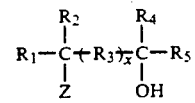

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydrogen and Z is hydroxyl.

26. A rigid vinyl halide resin composition of claim 19 wherein the liquid lubricating and stabilizing composition also comprises: (e) from about 0.1 to about 10.0% by weight of a alcohol or diol of the formula:

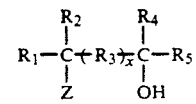

wherein $R_1$, $R_2$, $R_4$ and $R_5$ are each independently selected from the group consisting of hydrogen, alkyl or aryl and $R_3$ is an alkylene, arylene, alkenylene or alkynylene radical, Z is hydrogen, hydroxyl or an alkyl group substituted with a hydroxyl group, and x is zero or 1, with the proviso that the alcohols or diols contain from three to twelve carbon atoms and x is not zero when $R_1$, $R_2$, $R_4$ and $R_5$ are all hydrogen and Z is hydroxyl.

27. A rigid vinyl halide resin composition of claim 24 wherein the alcohol or diol is hexylene glycol.

28. A rigid vinyl halide resin composition of claim 25 wherein the alcohol or diol is hexylene glycol.

29. A rigid vinyl halide resin composition of claim 26 wherein the alcohol or diol is hexylene glycol.

* * * * *